United States Patent
Pinto et al.

(10) Patent No.: US 10,655,688 B2
(45) Date of Patent: May 19, 2020

(54) FAN-COUPLING DEVICE WITH UNITARY MAGNETIC POLE CONSTRUCTION

(71) Applicant: Standard Motor Products, Inc., Long Island City, NY (US)

(72) Inventors: Archibald E. Pinto, Fort Worth, TX (US); Santiago Yepes, Greenville, SC (US); Conrado Vargas Cardenas, Grand Prairie, TX (US)

(73) Assignee: Standard Motor Products, Inc., Long Island City, NY (US)

( * ) Notice: Subject to any disclaimer, the term of this patent is extended or adjusted under 35 U.S.C. 154(b) by 194 days.

(21) Appl. No.: 15/898,321

(22) Filed: Feb. 16, 2018

(65) Prior Publication Data

US 2019/0257373 A1    Aug. 22, 2019

(51) Int. Cl.
| | | |
|---|---|---|
| F16D 35/02 | (2006.01) | |
| F04D 25/02 | (2006.01) | |
| F16D 35/00 | (2006.01) | |
| F16K 31/06 | (2006.01) | |
| F16D 27/00 | (2006.01) | |

(52) U.S. Cl.
CPC ......... *F16D 35/024* (2013.01); *F04D 25/022* (2013.01); *F16D 35/005* (2013.01); *F16K 31/0644* (2013.01); *F16D 2027/008* (2013.01)

(58) Field of Classification Search
CPC .................................................. F16D 35/024
See application file for complete search history.

(56) References Cited

U.S. PATENT DOCUMENTS

| | | | |
|---|---|---|---|
| 2,315,298 A | 3/1943 | Thompson | |
| 2,430,174 A | 11/1947 | Hoover | |
| 4,556,138 A | 12/1985 | Martin et al. | |
| 5,101,950 A | 4/1992 | Schoenmeyer | |
| 5,152,383 A | 10/1992 | Boyer et al. | |
| 5,505,285 A * | 4/1996 | Organek | F16D 13/04 |
| | | | 192/35 |
| 5,642,560 A | 7/1997 | Tabuchi et al. | |
| 5,870,818 A | 2/1999 | Bisaga | |
| 5,992,594 A | 11/1999 | Herrle et al. | |
| 6,021,747 A | 2/2000 | Gee et al. | |
| 6,085,881 A | 7/2000 | Robb | |
| 6,443,283 B1 | 9/2002 | Augenstein et al. | |
| 6,550,596 B2 | 4/2003 | Shiozaki et al. | |
| 6,752,251 B2 | 6/2004 | May et al. | |
| 6,915,888 B2 | 7/2005 | Shiozaki et al. | |
| 7,083,032 B2 | 8/2006 | Boyer | |
| 7,191,883 B2 | 3/2007 | Angermaier | |

(Continued)

*Primary Examiner* — Mark A Manley
(74) *Attorney, Agent, or Firm* — Steven McMahon Zeller; Dykema Gossett PLLC

(57) ABSTRACT

A fan-coupling device with a unitary magnetic pole is disclosed. The magnetic pole is of a unitary, ring-shaped construction and includes a choke space and a ridge that promote an increased amount of magnetic flux generated by an electromagnet to travel to a magnetic armature on a fluid flow valve, resulting an increase in the amount of magnetic force that acts upon the valve. This is an improvement over the prior art two-piece magnetic pole structure and over a unitary magnetic pole without the choke space and ridge. The magnetic pole also includes apertures in which protrusions on a sound dampening gasket are inserted to reduce the noise resulting from the armature striking the magnetic pole.

11 Claims, 6 Drawing Sheets

(56) References Cited

U.S. PATENT DOCUMENTS

| | | |
|---|---|---|
| 7,278,524 B2 | 10/2007 | Boyer |
| 7,293,636 B2 | 11/2007 | May |
| 7,367,438 B2 | 5/2008 | Shiozaki et al. |
| 7,407,046 B2 | 8/2008 | Bhat et al. |
| 7,419,040 B2 | 9/2008 | Shiozaki et al. |
| 7,581,627 B2 | 9/2009 | McDermott et al. |
| 7,588,132 B2 | 9/2009 | Shiozaki et al. |
| 7,621,386 B2 | 11/2009 | Light |
| 7,854,307 B2 | 12/2010 | Hennessy et al. |
| 7,913,825 B2 | 3/2011 | Boyer |
| 7,913,826 B2 | 3/2011 | Boyer |
| 7,938,240 B2 | 5/2011 | Hennessy et al. |
| 7,946,400 B2 | 5/2011 | Hennessy et al. |
| 7,980,373 B2 | 7/2011 | Boyer |
| 8,100,241 B2 | 1/2012 | Hennessy et al. |
| 8,118,148 B2 | 2/2012 | Shiozaki et al. |
| 8,186,494 B2 | 5/2012 | Boyer |
| 8,596,438 B2 | 12/2013 | Boyer |
| 8,602,190 B2 | 12/2013 | May |
| 8,616,357 B2 | 12/2013 | Boyer |
| 8,701,852 B2 | 4/2014 | Boyer |
| 8,881,881 B2 | 11/2014 | Gevers et al. |
| 8,991,581 B2 | 3/2015 | Yamada et al. |
| 9,239,086 B2 | 1/2016 | Kubota et al. |
| 9,328,781 B2 | 5/2016 | Kubota et al. |
| 9,453,541 B2 | 9/2016 | Krammer et al. |
| 9,506,507 B2 | 11/2016 | Savela et al. |
| 2005/0196297 A1* | 9/2005 | Baumgartner ............ F01P 5/12 417/364 |
| 2006/0243817 A1 | 11/2006 | Light et al. |
| 2007/0110594 A1* | 5/2007 | Baumgartner ............ F01P 5/12 417/319 |
| 2008/0283352 A1 | 11/2008 | Purvines |
| 2011/0168512 A1 | 7/2011 | May |
| 2012/0247196 A1* | 10/2012 | Kageyama ................ F01P 5/14 73/114.68 |
| 2014/0209180 A1 | 7/2014 | Boyer |
| 2015/0129388 A1 | 5/2015 | Tilly et al. |
| 2015/0337908 A1 | 11/2015 | Wang |
| 2016/0032987 A1 | 2/2016 | Krammer et al. |
| 2016/0116005 A1 | 4/2016 | Cha |
| 2016/0123408 A1 | 5/2016 | Light et al. |
| 2016/0123409 A1 | 5/2016 | Light et al. |
| 2016/0131204 A1 | 5/2016 | Cha |
| 2016/0169235 A1 | 6/2016 | Ignatovich |
| 2016/0208867 A1* | 7/2016 | Sorg ..................... F16D 35/024 |

* cited by examiner

FAN-COUPLING DEVICE WITH UNITARY MAGNETIC POLE CONSTRUCTION

BACKGROUND a. Technical Field

The present invention relates generally to a fan-coupling device, in which the rotation of an engine cooling fan of an automobile is controlled according to an external control mechanism.

b. Background Art

Fan-coupling devices are known and are designed to use fluid, such as an oil, to transfer rotational energy from a drive unit (or an engine) to a fan through shear force. In a fan-coupling device, a sealed housing having a case and a cover is borne, through a bearing, on a rotary shaft member (or a drive shaft), which is rotated by a drive unit (or an engine). The sealed housing is divided into an oil sump chamber and a torque transmission chamber by a partition plate having an oil feed adjusting hole that allows oil to flow from the oil sump to the torque transmission chamber. An oil feed valve operates to open and close the oil feed adjusting hole.

A drive disc, fixed on the leading end of the rotary shaft member, is housed in the torque transmission chamber with a clearance between itself and an outer housing of the torque transmission chamber, such that the drive disk spins freely in the torque transmission chamber with rotation of the rotary shaft member. The outer housing of the torque transmission chamber is operatively connected to a cooling fan.

An external control device dictates when the cooling fan is to be engaged, at which point the oil feed valve is opened, allowing oil to flow through the oil feed adjusting hole to the torque transmission chamber. The torque from the spinning drive disc is transmitted, through shear force with the oil, to the outer housing of the torque transmission chamber, causing the cooling fan to rotate.

An oil recovering circulation passage is located in the case, allowing flow of oil from the chamber back into the oil sump. During rotation of the drive disc, oil accumulates at the periphery of the torque transmission chamber. When cooling is no longer required, the oil feed valve is closed, oil drains out of the torque transmission chamber, the shear forces between the drive disc and the housing reduces and the sealed housing disengages from the rotation of the drive disc.

The oil feed valve is opened by energizing a magnetic circuit that creates a magnetic force on an armature of the oil feed valve, pulling the valve away from the oil feed adjusting hole. When the magnetic circuit is de-energized, a spring or other tension member moves and holds the valve against the feed hole, preventing the flow of oil through the oil feed hole.

The magnetic circuit consists of a ring-shaped electromagnet mounted on the rotary shaft via a bearing. The electromagnet consists of an electromagnetic coil encased in a plastic material and housed within a ferromagnetic support member. A magnetic pole that is of a circular shape and construction is located between the electromagnetic coil and the armature of the oil feed valve. The magnetic pole transmits the magnetic flux of the ring-shaped electromagnet to the armature of the oil feed valve member.

Past issues encountered with the above described types of fan-coupling devices have arisen from the interaction of the magnetic circuit and the oil feed valve. The spring, or tension member of the oil feed value must be sufficiently strong enough to keep the valve in a closed position while the engine operates and the vehicle is moving. The magnetic circuit also must be strong enough to overcome tension forces to sufficiently attract the armature to open the valve and maintain it in the open position as long as required.

The size and weight of the electromagnet and other components of the magnetic circuit are impacted by the size of the magnetic force required to attract the armature of the oil valve and operate the valve in a reliable manner. It is desired, however, as with many vehicle components and parts, to minimize the weight and space required of the component. With magnetic circuits in fan-coupling devices, there is a need to improve the efficiency in the magnetic forces generated by the electromagnet rather than increasing the size of the electromagnets.

One way to improve the magnetic flux into the path of the armature on the valve member is to provide a design of the pole with the least resistance to magnetic transmission, thus increasing the forces acting on it without increasing the size of the electromagnet. One prior art method for improving the magnetic flux profile around the armature can be seen in U.S. Pat. No. 6,915,888. There, the magnetic pole is a two-part, split ring structure with a non-magnetic adhesive joining the rings on the face that affronts the armature of the feed valve. This prevents or reduces the magnetic flux profile to leak from the magnetic pole and towards the armature. This two-piece solution, however, adds complexity to the design, manufacturing and assembly, making it expensive to produce.

There are further problems in prior art designs, such as at the interface between the armature of the valve member and the face of the magnetic pole that the armature comes into contact with. For example, when the electromagnet is initially energized, the force applied to the armature may cause it to rapidly accelerate into the magnetic pole, creating loud noise. The constant impact can cause unnecessary wear and tear on the armature and/or oil feed valve itself, resulting in possible failure or excessive replacement of parts.

There is a need, therefore, to provide a fan coupling device with a magnetic circuit including a novel magnetic pole design that maintains the efficiency of the magnetic flux in a less costly and simpler to manufacture method, while also addressing the excessive noise issues encountered with prior art designs.

SUMMARY OF THE INVENTION

A fan-coupling device is presented to address the needs described above.

In an embodiment, a fan-coupling device with a sealed housing comprised of a cover attached to a case is disclosed. The sealed housing is mounted on a rotary shaft via a bearing with the sealed housing freely rotating about the rotary shaft. The interior of the sealed housing is divided by a partition plate into an oil sump chamber and a torque transmission chamber, with the partition plate including an oil feed hole that allows oil from the oil sump chamber to flow into the torque transmission chamber. A valve operates to open and close the oil feed hole. A drive disc is housed inside the torque transmission chamber and fixed on the end of the rotary shaft, which drives the rotation of the drive disc. A magnetic circuit acts on an armature, made of a magnetic material, on the oil feed valve to move the valve into an open position while a spring portion of the valve keeps the valve in a closed position when no force is acting on the armature. The magnetic circuit comprises a ring shaped electromagnetic coil mounted on the rotary shaft via a bearing, a ring-shaped magnetic pole arranged between the electromagnet and the oil feed valve. The magnetic pole is a unitary, disc-shaped structure having a top surface between the armature and the electromagnet. A portion of the top surface is thinner than other portions and acts as a choke space for the magnetic flux generated by the electromagnet. A ridge is disposed around the periphery of the top surface and extends above the top surface. Accordingly, the design provides for sufficient magnetic force to act upon the armature while providing a magnetic pole that is less costly and easier to manufacture than prior art two-piece designs.

In another embodiment, a fan-coupling device having a sealed housing comprised of a cover attached to a case is disclosed. A magnetic circuit is provided that acts upon an armature, made of a magnetic material, portion of an oil feed valve, the oil feed valve operating to open and close an oil feed hole in a partition plate separating the sealed housing into two chambers. The magnetic circuit comprises a ring shaped electromagnetic coil and a ring-shaped magnetic pole arranged between the electromagnet and the armature on the oil feed valve. The magnetic pole is a unitary, disc-shaped structure having a top surface between the armature and the electromagnet. A portion of the top surface is thinner than other portions and acts as a choke space for the magnetic flux generated by the electromagnet. A ridge is disposed around the periphery of the top surface and extends above the top surface. A plurality of apertures are equally disposed around the top surface. A sound dampening ring made of an elastomer is disposed on a side of the magnetic pole opposite the top surface, the sound dampening ring including a plurality of protrusions disposed around one side of the sound dampening ring and inserted into and through the apertures in the top surface. The sound dampening ring is supported by a non-magnetic element that is mechanically secured to the pole. Accordingly, the fan-coupling device provides for sufficient magnetic force to act upon the armature while providing a magnetic pole that is less costly and easier to manufacture than prior art two-piece designs. Further, the design provides for dampening of the noise created by the armature striking the top surface of the magnetic pole.

In an embodiment, there is also provided a ring-shaped magnetic pole for use in a magnetic circuit inside a fan-coupling device. The magnetic pole is of a unitary construction and is designed to be mounted around a rotary shaft. The magnetic pole has an inner wall defining a circular inner space which surrounds the rotary shaft, and an outer wall at the periphery of the magnetic pole, the inner and outer walls being concentric and parallel. The bottom of the inner wall and the bottom of the outer wall are on the same plane, with the inner wall being taller than the outer wall. A middle wall, concentric and parallel with the inner and outer walls, is located between the inner and outer walls. An outer top surface of the magnetic pole extends perpendicular from the top of the outer wall to the bottom of the middle wall. An inner top surface extends perpendicular from the top of the middle wall to the top of the inner wall. A portion of the inner top surface is thinner than other portions and acts as a choke space for the magnetic flux generated by an electromagnet in the fan-coupling device. A ridge is positioned on top of the middle wall extending above the inner top surface, and creating a ridge face that is perpendicular to the inner top surface. On the underside of the bottom of the magnetic pole, a ledge is disposed along the circumference of an interior surface of the middle wall, the ledge being located at a height between the outer top surface and the inner top surface. The ledge creates a circular space for a sound dampening gasket and an insulating ring gasket in the space between the outer top surface and the inner top surface on the underside of the magnetic pole. A notch is located on a face of the circular inner space on the inner wall in which is fitted an o-ring. Thus, there is a provided a magnetic pole for a fan-coupling device that provides for sufficient magnetic force to act upon an oil feed valve in a less expensive and easier to manufacture unitary construction.

In a further embodiment, there is provided a ring-shaped magnetic pole for use in a magnetic circuit inside a fan-coupling device. The magnetic pole is of a unitary construction and is designed to be mounted around a rotary shaft. The magnetic pole has an inner wall defining a circular inner space which surrounds the rotary shaft, and an outer wall at the periphery of the magnetic pole, the inner and outer walls being concentric and parallel. The bottom of the inner wall and the bottom of the outer wall are on the same plane, with the inner wall being taller than the outer wall. A middle wall, concentric and parallel with the inner and outer walls, is located between the inner and outer walls. An outer top surface of the magnetic pole extends perpendicular from the top of the outer wall to the bottom of the middle wall. An inner top surface extends perpendicular from the top of the middle wall to the top of the inner wall. The inner top surface includes a plurality of equally spaced apart apertures. A ridge is positioned on top of the middle wall extending above the inner top surface, and creating a ridge face that is perpendicular to the inner top surface. On the underside of the bottom of the magnetic pole, a ledge is disposed along the circumference of an interior surface of the middle wall, the ledge being located at a height between the outer top surface and the inner top surface. The ledge creates a circular space for a sound dampening gasket and an insulating ring gasket in the space between the outer top surface and the inner top surface on the underside of the magnetic pole. The sound dampening gasket includes a plurality of equally spaced apart protrusions that are configured to fit into and through the apertures in the inner top surface. A notch is located on a face of the circular inner space on the inner wall in which is fitted an o-ring. Thus, there is a provided a magnetic pole for a fan-coupling device that provides for sufficient magnetic force to act upon an oil feed valve will also providing sound dampening in a less expensive and easier to manufacture unitary construction.

The foregoing and other aspects, features, details, utilities, and advantages of the present invention will be apparent from reading the following description and claims, and from reviewing the accompanying drawings.

BRIEF DESCRIPTION OF THE DRAWINGS

Further embodiments of the invention are indicated in the figures and in the dependent claims. The invention will now be explained in detail by the drawings. In the drawings:

DETAILED DESCRIPTION OF THE INVENTION

Figure 1:
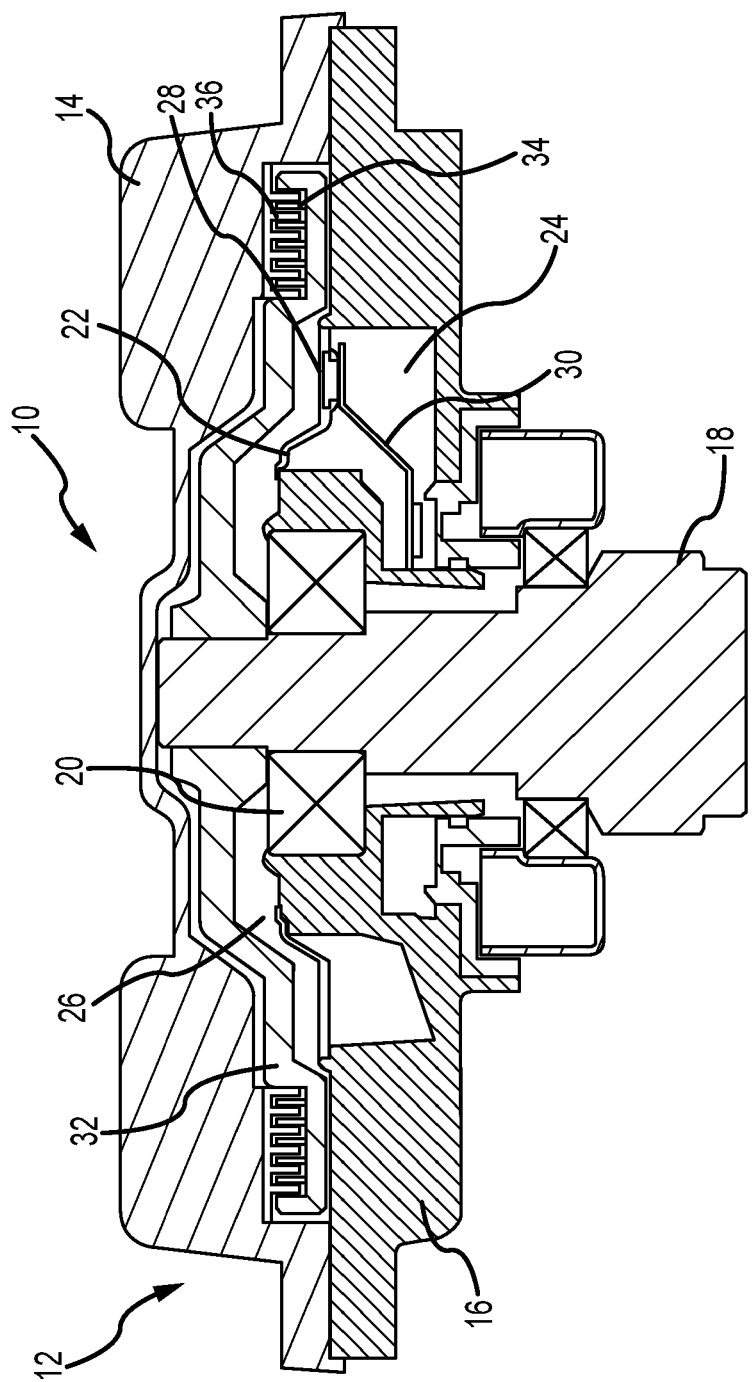
FIG. 1 is a cross-sectional view of an exemplary embodiment of a fan-coupling device having a magnetic pole according to one aspect of the invention.

Referring to the drawings, wherein like reference numerals refer to the same or similar features in the various views, FIG. 1 is a cross-sectional view of an embodiment of a fan-coupling device 10. The fan-coupling device 10 consists of a sealed housing 12 comprised of a cover 14 attached to a case 16. The sealed housing 12 is mounted on a rotary shaft member 18 via a bearing 20. The rotary shaft member 18 acts as a drive shaft and is connected to and rotated by the engine of an automobile. The sealed housing 12 freely rotates about the rotary shaft member 18.

The sealed housing 12 is divided on its inside by a partition plate 22 into an oil sump chamber 24 and a torque transmission chamber 26. The partition plate 22 includes an oil feed hole 28 that allows oil from the oil sump chamber 24 to flow into the torque transmission chamber 26. The oil feed hole 28 is covered by a moveable oil feed valve 30 that operates to open and close the oil feed hole 28. A drive disc 32 is housed inside the torque transmission chamber 26 and fixed on the end of the rotary shaft member 18. The rotary shaft member 18 drives the rotation of the drive disc 32.

A plurality of concentric ribs 34 are disposed on the outer edge of the drive disc 32 and are interspersed with a plurality of concentric ribs 36 disposed on an inner surface of the cover 14. The ribs 34 and 36 are close to one another but do not touch. In operation, the drive disk 32 rotates with the rotation of the rotary shaft 18 while the sealed housing 12 rotates freely about the rotary shaft 18. The sealed housing 12 is coupled to a fan (not shown) that provides air cooling for the engine cooling system.

When engine cooling is needed, the oil feed valve 30 opens to allow fluid to flow into the torque transmission chamber 26 through the oil feed hole 28. As the fluid flows through the narrow gap between ribs 34 and 36, viscous shear in the fluid exerts torque on the drive disc 32 and sealed housing 12, causing the sealed housing 12 to rotate with the drive disc 32. In perfect conditions, the sealed housing 12 may rotate at or close to the same speed as the drive disc 32. A return passage (not shown) exists between the torque transmission chamber 26 and the oil sump chamber 24, near the peripheral edge of the drive disc 32. During rotation, centrifugal forces push the fluid to the return passage where it is forced back into the oil sump chamber 24.

When further cooling is no longer needed, the oil feed valve 30 is closed and as the remaining fluid in the torque transmission chamber 26 is forced through the return passage. As the amount of oil in the torque transmission chamber 26 decreases, the viscous shear between the ribs 34 and 36 is reduced and the rotation of the sealed housing 12 is reduced relatively to the rotation of the drive disc 32 and the rotary shaft 18.

Figure 2:
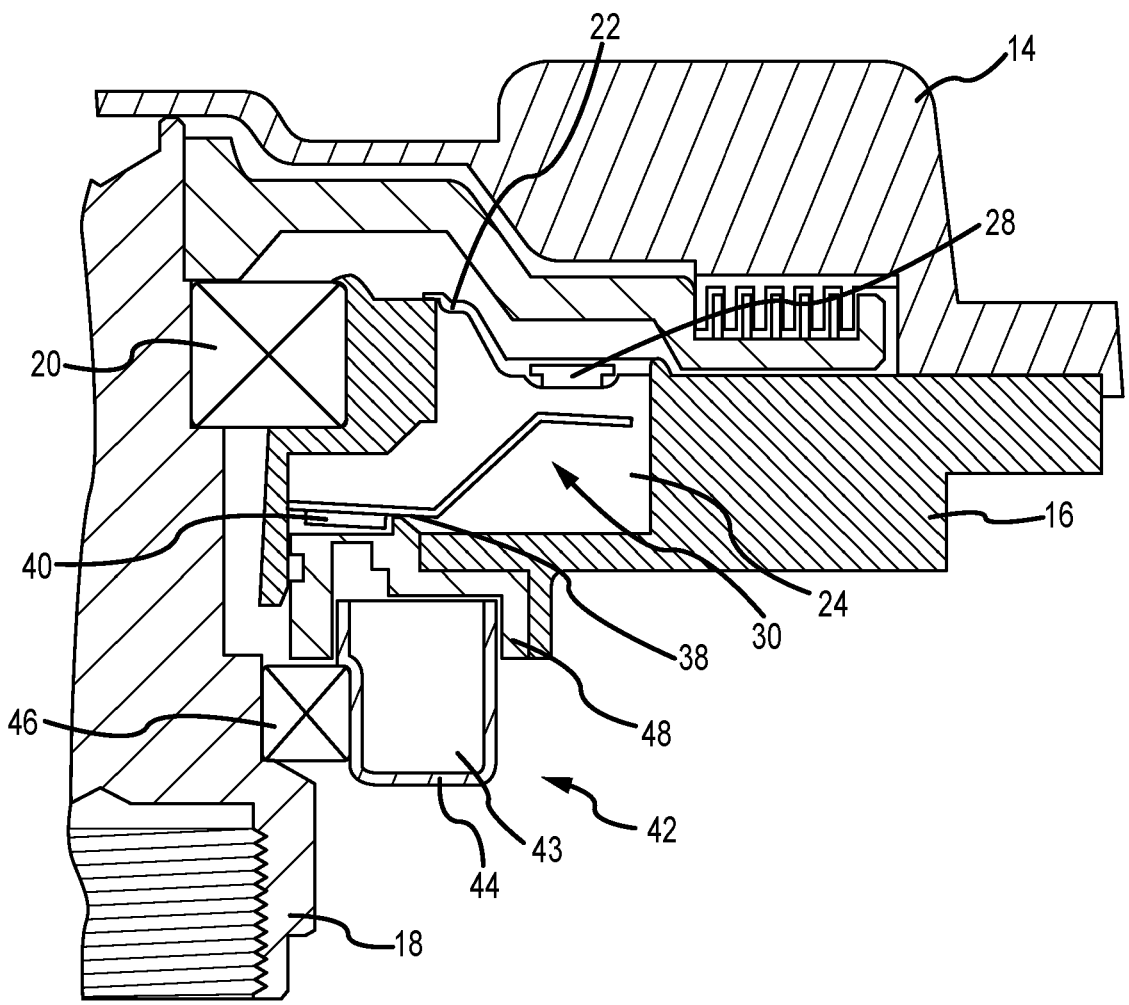
FIG. 2 is an enlarged cross-section view of a portion of the same fan-coupling device of FIG. 1, shown with the oil feed valve open.

FIG. 2 shows an exploded cross-sectional view of the embodiment of a fan-coupling device 10 from FIG. 1. The oil feed valve 30 is comprised of a leaf spring portion 38 and an armature portion 40. In FIG. 2, the oil feed valve 30 is shown in the open position (i.e., fluid can travel through the oil feed hole 28), while in FIG. 1 the oil feed valve 30 is shown in the closed position (i.e., the oil feed hole 28 is blocked). The oil feed valve 30 is mounted so that the leaf spring portion 38 keeps the oil feed valve 30 in the closed position when no other forces are acting on the oil feed valve 30.

A magnetic circuit acts on the armature portion 40 to force the oil feed valve 30 into an open position, as shown in FIG. 2. The magnetic circuit consists of a ring shaped electromagnet 42. The electromagnet 42 is comprised of an electromagnetic coil encased in a plastic material 43, and together housed within a ferromagnetic support 44. The ring-shaped electromagnet 42 is mounted on the rotary shaft member 18 via a bearing 46. A ring-shaped magnetic pole 48 is arranged between the electromagnet 42 and the oil feed valve 30. When the electromagnet 42 is energized, the magnetic flux generated acts upon the armature 40, drawing the armature 40 towards the magnetic pole 48, which causes the oil feed valve 30 to pull away from the partition plate 22, opening the oil feed hole 28 for fluid flow. When the electromagnet 42 is de-energized, the leaf spring portion 38 draws the armature 40 away from the magnet pole 48 towards the oil feed hole 28 to close it.

Figure 3:
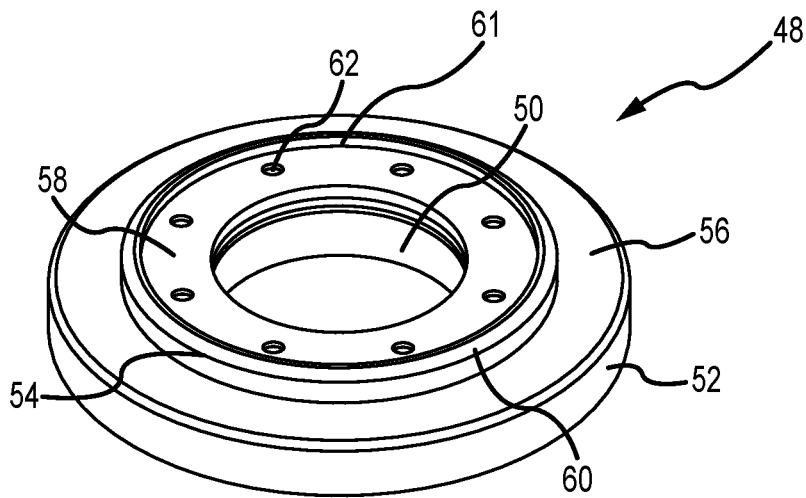
FIG. 3 shows a top perspective view of a magnetic pole according to one aspect of the invention.
Figure 4:
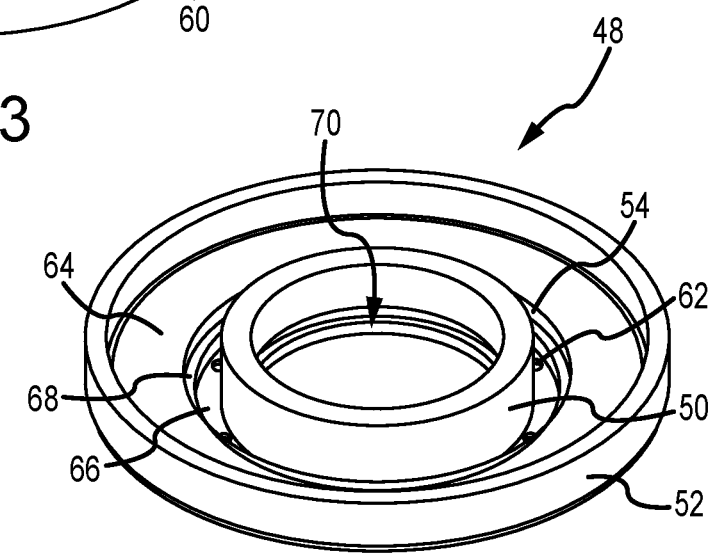
FIG. 4 shows a bottom perspective view of the magnetic pole of FIG. 3.

FIGS. 3 and 4 show top perspective and bottom perspective views, respectively, of the magnetic pole 48. The magnetic pole 48 is a unitary, disc-shaped structure comprised of an inner wall 50 and an outer wall 52, the inner and outer walls 50 and 52 being concentric. The inner wall 50 is taller than the outer wall 52. On the top of the magnetic pole 48, there is a middle wall 54 located between the outer wall 52 and the inner wall 50, the middle wall 54 also being concentric with the inner and outer walls 50 and 52. An outer top surface 56 extends between the outer wall 52 and the middle wall 54, while an inner top surface 58 extends between the middle wall 54 and the inner wall 50.

A ridge 60 is located at the top of middle wall 54 and around the periphery of the inner top surface 58. In the embodiment of FIG. 3, ridge 60 has a triangular cross-section, but in other embodiments ridge 60 can have a cross-section of a different shape. Ridge 60 extends above the inner top surface 58 forming an inner ridge surface 61 that extends above and is substantially perpendicular to the inner top surface 58.

Two or more apertures 62 are in the inner top surface 58. In the embodiment shown, eight apertures 62 are shown, arranged approximately equally spaced around the inner top surface 58. In other embodiments, less than eight apertures may be present and in other embodiments more than eight apertures may be present.

On the underside of magnetic pole 48, as shown in FIG. 4, a bottom outer surface 64 is located opposite the top outer surface 56, between the outer wall 52 and the middle wall 54. A bottom inner surface 66 is opposite the top inner surface 58, between the middle wall 54 and inner wall 50. A ledge 68 is formed along the circumference of an interior surface of the middle wall 54, the ledge 68 being at a height between the bottom outer surface 64 and the bottom inner surface 66. The existence of the ledge 68 causes the distance between the middle wall 54 and the inner wall 50 to be diametrically greater at the level of the bottom outer surface 64 than at the bottom inner surface 66. A notch 70 is located around the circumference of an interior surface of the inner wall 50, close to the inner top surface 58.

Figure 5:
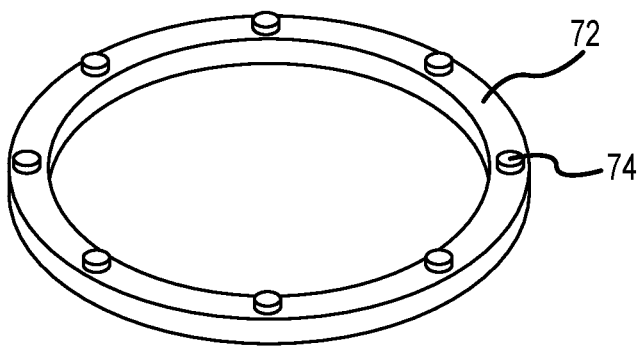
FIG. 5 shows a perspective view of a sound dampening ring according to one aspect of the invention.

The space between the ledge 68 and the inner wall 50 is configured to accommodate a sound dampening ring 72, as shown in FIG. 5. Sound dampening ring 72 preferably has a rectangular cross-section. Sound dampening ring 72 includes at least two protrusions 74, arranged around one side of the sound dampening ring 72. The protrusions 74 are preferably in the same quantity and spacing as the apertures 62 on the bottom inner surface 66. The sound dampening ring 72 is sized to fit in the space between the ledge 68 and the inner wall 50, with the protrusions 74 fitting in, and extending through the apertures 62.

The protrusions 74 of the sound dampening ring 72 are preferably made from rubber or similar elastomer material, and may be integrated with the sound dampening ring 72 (i.e., the sound dampening ring 72 may be formed from an elastomer with the protrusions 74) or the protrusions 74 may be attached to the sound dampening ring 72 by adhesive or other attachment means. The top surfaces of the protrusions may be flat, conical or semi-hemispherical to maximize the dampening effect of the protrusions based on its geometry.

Figure 6:
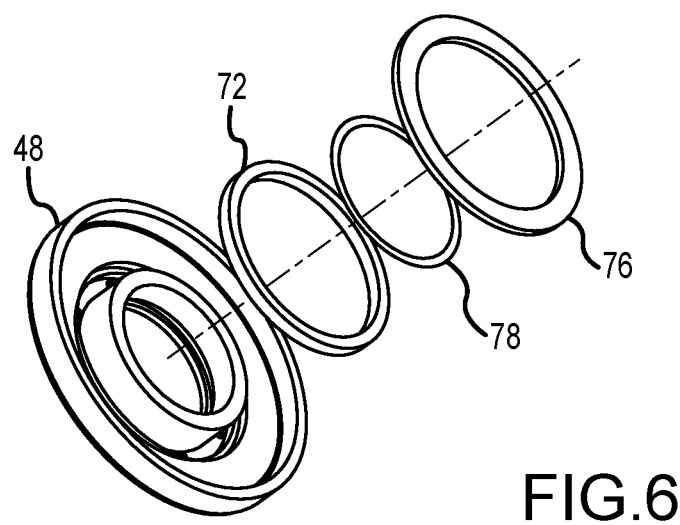
FIG. 6 is an exploded view of the magnetic pole of FIGS. 3 and 4, and related gasket assembly components.

FIG. 6 shows an exploded view of the magnetic pole 48 with the gasket components of the sound dampening ring 72, as well as an o-ring 78 and an insulating ring 76.

Figure 7:
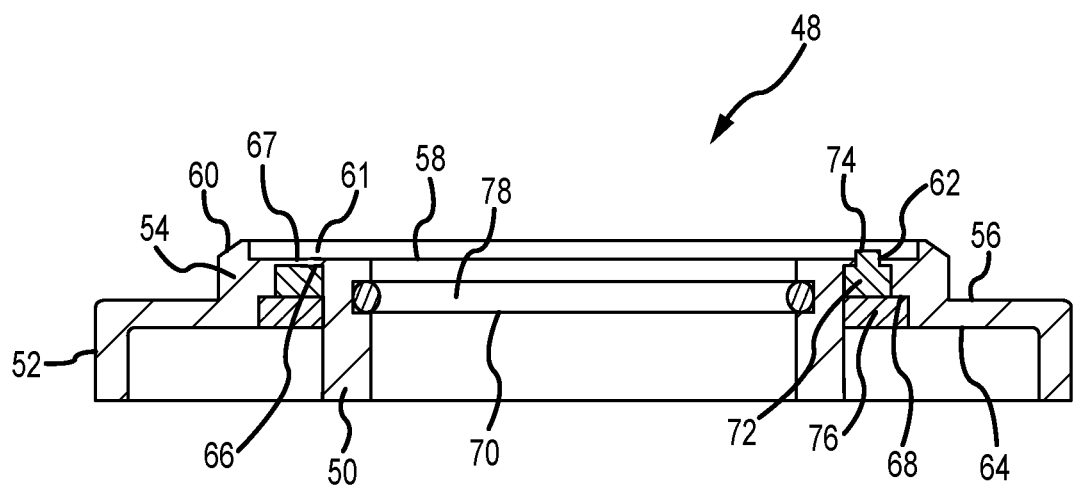
FIG. 7 is a cross-sectional view of the magnetic pole of FIG. 3 assembled with the gasket components of FIG. 6 according to an aspect of the invention.

FIG. 7 shows a cross-section of the magnetic pole 48 with the sound dampening ring 72 fitted in place. The protrusions 74 extend through apertures 62 above the inner top surface 58. Helping to secure the sound dampening ring 72 in place is insulating ring 76, which fits in the space between the middle wall 54 and the inner wall 50, with one side against the sound dampening ring 72 and the other side being substantially flush with the outer bottom surface 64. The insulating ring 76 may be made of a non-magnetic metal, a polymer or other plastic that is firmly secured by physical or mechanical boding methods. Finally, o-ring 78 is fitted into notch 70 on the interior surface of inner wall 50.

The magnet flux generated by the electromagnet 42 must produce adequate magnetic force on the armature 40 to draw it toward the magnetic pole 48 and open the oil feed valve 30. The prior art design of a two-piece magnetic pole has a gap in the magnetic material across the top of the magnetic pole above the electromagnet and below the armature. While some of the magnet flux will leak across the gap, much of it is forced up onto the armature as the path of least resistance. Without a gap across the top of the magnetic pole, such as with one having a unitary construction, the leakage of magnetic flux across the top of the magnetic pole is greater, with less flux acting on the armature. Accordingly, less magnetic force is available to act on the armature. In an embodiment of the present invention, certain design features were discovered that improve the magnetic flux profile and increase the magnetic force acting on the armature, replicating the performance of the two-piece prior art design.

Figure 8:
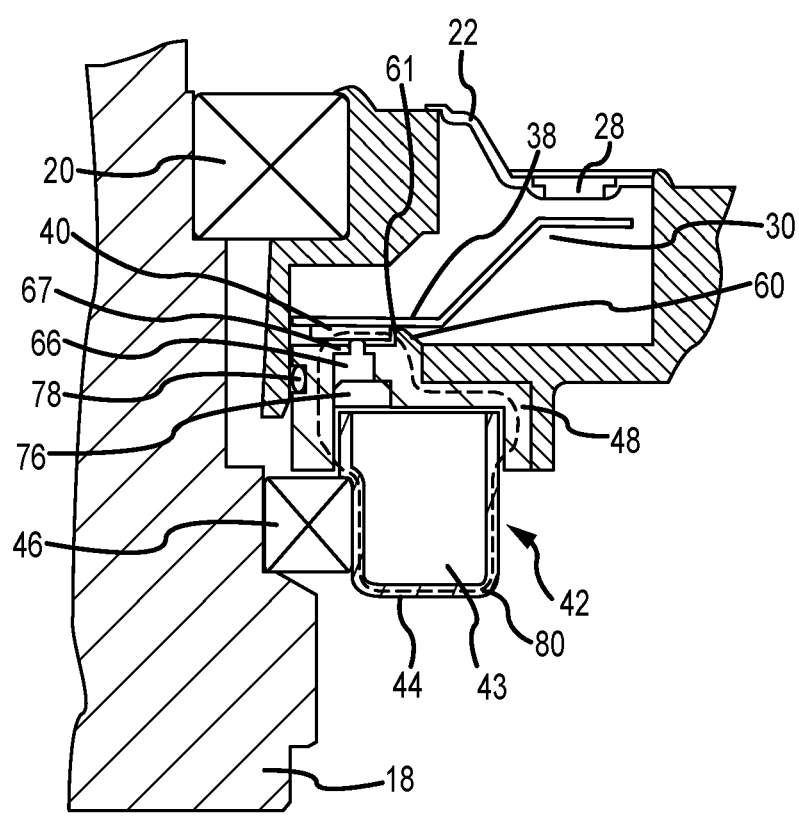
FIG. 8 is a cross-section view of a the magnetic circuit components of the fan-coupling device of FIG. 2, showing the magnetic flux path.

FIG. 8 is a detail view of the magnetic circuit and components described above. When electromagnet 42 is energized, a magnetic flux is created as shown by flux lines 80. As can be seen in FIGS. 7 and 8, choke space 67 of the magnetic pole 48 is between the inner top surface 58 and inner bottom surface 66. The choke space 67 is the thinnest portion of the magnetic pole 48, which creates a choke point for the magnetic flux across the top of the magnetic pole 48. This helps to force the magnetic flux up onto the armature 40 of the oil feed valve 30. The thin choke space 67 by itself, however, does not cause enough magnetic flux leakage to result in a reduction in the amount of force to act on the armature 40.

Figure 9:
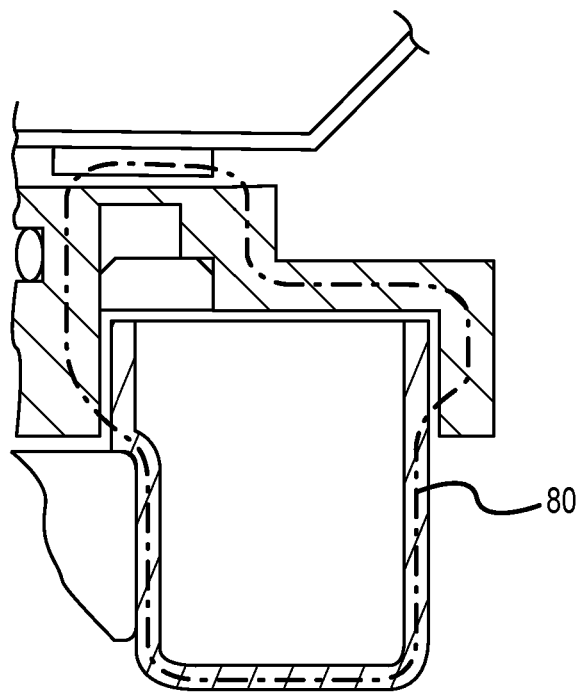
FIGS. 9 and 10 show simulated magnetic flux lines of an energized electromagnet in a device of FIG. 8 and of an alternative embodiment.
Figure 10:
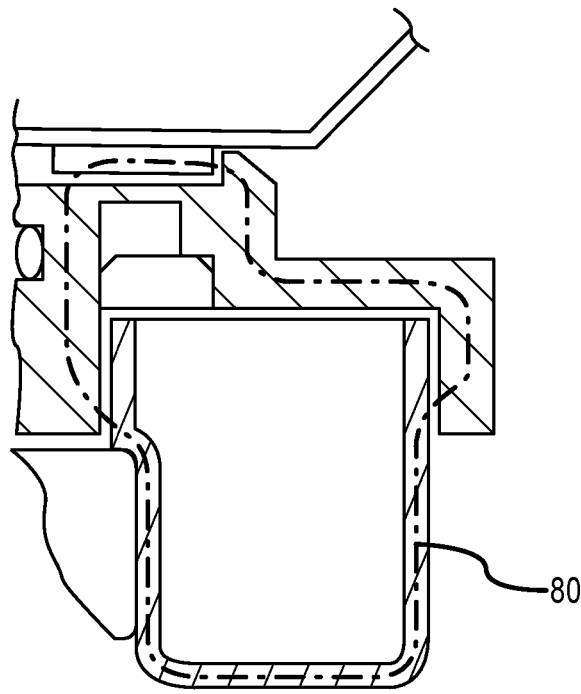

It was discovered that a greater amount of magnetic flux traveled through the armature 40—thus producing the desired force—the magnetic pole 48 includes ridge 60. By creating a path for the magnetic flux to flow between the armature 40 and ridge 60, more of the flux passes through the armature 40 by utilizing its circumferential area in addition to the area of its face. As shown in FIGS. 7 and 8, inner ridge face 61 of ridge 60, which is perpendicular to inner top surface 58, provides an easier path for the magnetic flux to travel from armature 40 to the magnetic pole 48. FIGS. 9 and 10 show simulated magnetic flux lines produced by an energized electromagnet in the embodiment described above (FIG. 10, with ridge 60) and in an identical device without ridge 60 (FIG. 9). When ridge 60 is added, more of the flux goes through a greater portion of the armature 40, resulting in a greater force available to act on the armature.

The magnetic force acting on an armature in the prior art two-piece device was measured with the electromagnet energized at two different voltages—9 volts and 18 volts. A simulation applying the same voltages was conducted on a device with a magnetic pole as described herein, as well as a device with a similar magnetic pole but without ridge 60. The results of the measurement and simulations are shown in Table 1.

TABLE 1

| Design | Force generated on armature | |
|---|---|---|
| | @9 volts (N) | @18 volts (N) |
| Prior Art two-piece device | 8.4 | 19 |
| 1 piece, thin choke | 5.6 | 13.0 |
| 1 piece, thin, ridge | 8.4 | 18.8 |

As can be seen, in a design with only the thin choke spare, the force generated on the armature is only about two-thirds the amount of force generated in the prior art two-piece device. However, in the embodiment disclosed herein, with both the choke space 67 and ridge 60, the force generated on the armature 40 is approximately equal to the force generated in the prior art two-piece device.

An additional advantage of the unitary structure of an embodiment of the present invention lies in the ability to easily add sound dampening features.

The distance between armature 40 and the inner top surface 58 of the magnetic pole 48 can be closer in order for more magnetic flux to be transferred between the two parts. When the electromagnet 42 is energized, the armature 40 will strike the protrusions 74 of the sound dampening ring 72 rather than the inner top surface 52, lessening the amount of noise that would otherwise result.

There has thus been described herein a new and novel magnetic pole design for a fan-coupling device that offers an improvement over two-piece designs in the prior art. The unitary construction offers a relatively lower cost, as well as a simpler and less complicated construction and assembly. These benefits are achieved while providing substantially similar performance characteristics as well as sound dampening capabilities.

It should be noted that, although the apparatus of this disclosure has been described with respect to certain preferred and alternative embodiments, and that specific details are set forth herein to provide a thorough understanding of the overall structure, function, manufacture, and use of the embodiments, it should be understood by those skilled in the art, however, that the embodiments may be practiced without such specific details.

In other instances, well-known operations, components, and elements have not been described in specific detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments" "one embodiment," or "an embodiment", means that a particular feature, structure, or characteristic described in connection with the embodiment is included in at least one embodiment. Thus, appearances of the phrases "in various embodiments," "in some embodiments," "in one embodiment," or "in an embodiment", in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation given that such combination is not illogical or non-functional.

Although numerous embodiments of this invention have been described above with a certain degree of particularity, those skilled in the art could make numerous alterations to the disclosed embodiments without departing from the spirit or scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the any aspect of the disclosure. As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A fan-coupling device, comprising:
   a housing comprised of a case and a cover, the housing being mounted on a rotary shaft via a first bearing;
   a partition plate located inside the housing, the partition plate dividing the interior of the housing into an oil sump chamber and a torque transmission chamber, the partition plate including an oil feed hole configured to allow fluid to flow between the oil sump chamber and the torque transmission chamber;
   an oil feed valve, comprising a spring portion and an armature, the oil feed valve configured to cover the oil feed hole in the partition plate and to open the oil feed hole when a force is applied to the armature; and
   a magnetic circuit configured to cause a magnetic force to be applied to the armature of the oil feed valve sufficient to cause the oil feed valve to open the oil feed hole, the magnetic circuit comprising:
     a ring-shaped electromagnet mounted on the rotary shaft via a second bearing; and
     a disc-shaped magnetic pole disposed between the electromagnet and the armature of the oil feed valve, the magnetic pole being of a unitary construction and comprising:
       a ring-shaped inner wall defining an opening configured to receive the rotary shaft;
       a ring-shaped outer wall concentric with the inner wall and located on the outer periphery of the disc-shaped magnetic pole, the inner wall and the outer wall partially surrounding the electromagnet;
       a ring-shaped middle wall concentric with and located between the inner wall and the outer wall;
       a top surface located between the inner wall and the middle wall, the top surface facing the armature of the oil feed valve;
       a thin choke area disposed on a portion of the top surface, the thin choke area being thinner than other portions of the top surface; and
       a ridge disposed on top of the middle wall and around the outer periphery of the top surface, the ridge extending above the top surface
   wherein a magnetic flux generated by the electromagnet is conducted to the armature through the inner wall and the outer wall.

2. The fan-coupling device of claim 1, wherein the magnetic pole further comprises a plurality of apertures in the top surface.

3. The fan-coupling device of claim 2, further including a sound dampening gasket disposed on the magnetic pole on a side opposite the top surface, the sound dampening gasket including a plurality of protrusions configured to fit into and extend through the plurality of apertures in the top surface of the magnetic pole.

4. The fan-coupling device of claim 1, wherein the ridge is concentric to an outer peripheral surface of the armature for enhancing the transmission of magnetic flux resulting in a relatively greater magnetic force.

5. The fan-coupling device of claim 1, wherein the ridge comprises a ridge face substantially perpendicular to the top surface of the magnetic pole.

6. The fan-coupling device of claim 5, wherein the ridge face is substantially parallel to an outer peripheral surface of the armature.

7. The fan-coupling device of claim 1, wherein the ring-shaped electromagnet comprises an electromagnetic coil encased in a plastic material, and together housed within a ferromagnetic support housing.

8. A unitary disc-shaped magnetic pole configured for use in a magnetic circuit inside a fan-coupling device, the disc-shaped magnetic pole comprising:
- a circular inner wall defining an opening, the opening being configured to receive a rotary shaft member of the fan-coupling device;
- a circular outer wall on the outer periphery of the disc-shaped magnetic pole; a circular middle wall located between and concentric with the inner wall and the outer wall, wherein the height of the inner wall is substantially the same as a combined height of the outer wall and the middle wall;
- a top side comprising:
- an outer top surface extending between a top of the outer wall and a bottom of the middle wall;
- an inner top surface extending between the top of the middle wall and a top of the inner wall;
- a ridge located on the top of the middle wall and around the periphery of the inner top surface, the ridge having an inner ridge surface extending above and substantially perpendicular to the inner top surface, the inner ridge surface facing toward a center of the magnetic pole; and
- a bottom side opposite the top side and comprising:
- an outer bottom surface opposite the outer top surface and located between the outer wall and the middle wall;
- an inner bottom surface opposite the inner top surface and located between the middle wall and the inner wall; and
- a solid ledge located on an outer periphery of the inner bottom surface and adjacent to the middle wall, the ledge extending from the middle wall.

9. The unitary disc-shaped magnetic pole of claim 8, further comprising two or more apertures located in the inner top surface extending through the inner bottom surface.

10. The unitary disc-shaped magnetic pole of claim 8, further comprising a notch located around a circumference of an interior surface of the inner wall.

11. The unitary disc-shaped magnetic pole of claim 8, wherein the ridge comprises a triangular cross-section.

* * * * *